US011558437B2

(12) United States Patent
Ruetschi et al.

(10) Patent No.: US 11,558,437 B2
(45) Date of Patent: *Jan. 17, 2023

(54) COMMUNICATION SYSTEM AND METHOD OF USING THE SAME

(71) Applicant: RingCentral, Inc., Belmont, CA (US)

(72) Inventors: Johannes Ruetschi, Boca Raton, FL (US); Luiz Domingos, Boca Raton, FL (US); Christian Garbin, Boca Raton, FL (US); Thomas Lederer, Herrsching (DE)

(73) Assignee: RINGCENTRAL, INC., Belmont, CA (US)

( * ) Notice: Subject to any disclaimer, the term of this patent is extended or adjusted under 35 U.S.C. 154(b) by 623 days.

This patent is subject to a terminal disclaimer.

(21) Appl. No.: 16/710,343

(22) Filed: Dec. 11, 2019

(65) Prior Publication Data

US 2020/0112595 A1 Apr. 9, 2020

Related U.S. Application Data

(63) Continuation of application No. 15/869,387, filed on Jan. 12, 2018, now Pat. No. 10,542,056, which is a (Continued)

(51) Int. Cl.
*H04L 65/4038* (2022.01)
*H04M 7/00* (2006.01)
(Continued)

(52) U.S. Cl.
CPC ........ *H04L 65/4038* (2013.01); *G06F 40/263* (2020.01); *G06F 40/58* (2020.01);
(Continued)

(58) Field of Classification Search
CPC ............. H04L 65/1069; H04L 65/1073; H04L 65/1076; H04L 65/4038; H04M 3/565;
(Continued)

(56) References Cited

U.S. PATENT DOCUMENTS 6,968,179 B1    11/2005   De Vries
7,187,764 B2     3/2007   Ruetschi
(Continued)

FOREIGN PATENT DOCUMENTS

EP          2533493 A1     12/2012
WO      2011/136789 A1    11/2011

OTHER PUBLICATIONS

Summons to attend oral proceedings dated Aug. 31, 2020, issued in European Patent Application No. 16 707 769.2-1213 (10 pages).
(Continued)

*Primary Examiner* — Michael Thier
*Assistant Examiner* — Prince A Mensah
(74) *Attorney, Agent, or Firm* — Finnegan, Henderson, Farabow, Garrett & Dunner LLP

(57) ABSTRACT

A communication system can include terminal devices that communicate with a social network or a computer server device for scheduling use of conference resources and/or for using conference appliances that may be located in a conference room being used for a video conference or teleconference. The communication system can be configured to permit a user to use such resources without having to have a user's device be physically and directly connected by wiring to a conference appliance or communication device. The communication system can also be configured to validate participants to help ensure that only authorized personnel are properly attending a scheduled conference based on audio and/or video input received for the different participants and can also be configured to allow screen sharing to be performed during a video conference or teleconference.

20 Claims, 9 Drawing Sheets

Related U.S. Application Data continuation-in-part of application No. 14/637,449, filed on Mar. 4, 2015, now abandoned.

(51) Int. Cl.
| | |
|---|---|
| *H04L 65/1069* | (2022.01) |
| *H04M 3/56* | (2006.01) |
| *H04L 65/1076* | (2022.01) |
| *H04L 65/1073* | (2022.01) |
| *G06F 40/58* | (2020.01) |
| *G06F 40/263* | (2020.01) |
| *G10L 17/00* | (2013.01) |

(52) U.S. Cl.
CPC ...... *H04L 65/1069* (2013.01); *H04L 65/1073* (2013.01); *H04L 65/1076* (2013.01); *H04M 3/565* (2013.01); *H04M 7/0027* (2013.01); *G10L 17/00* (2013.01); *H04M 2203/2061* (2013.01); *H04M 2203/6045* (2013.01); *H04M 2203/6081* (2013.01); *H04M 2203/655* (2013.01)

(58) Field of Classification Search
CPC ......... H04M 7/0027; H04M 2203/655; H04M 2203/6045
See application file for complete search history.

(56) References Cited

U.S. PATENT DOCUMENTS

| | | | |
|---|---|---|---|
| 7,418,084 B2 | 8/2008 | Ruetschi et al. | |
| 7,672,436 B1 | 3/2010 | Thenthiruperai et al. | |
| 7,885,901 B2 | 2/2011 | Hull et al. | |
| 7,933,955 B2 | 4/2011 | Khalatian | |
| 8,169,949 B1 | 5/2012 | Sankaranaraynan et al. | |
| 8,184,796 B2 | 5/2012 | Ruetschi et al. | |
| 8,185,086 B2 | 5/2012 | Bozionek et al. | |
| 8,279,254 B2 | 10/2012 | Goose et al. | |
| 8,325,709 B2 | 12/2012 | Fartmann et al. | |
| 8,345,665 B2 | 1/2013 | Vieri et al. | |
| 8,645,207 B2 | 2/2014 | Blank | |
| 8,781,838 B2 | 7/2014 | Krause | |
| 8,838,152 B2 | 9/2014 | Tang et al. | |
| 2004/0198398 A1 | 10/2004 | Amir et al. | |
| 2006/0242235 A1 | 10/2006 | Classen et al. | |
| 2007/0190995 A1 | 8/2007 | Wang et al. | |
| 2009/0111443 A1 | 4/2009 | Gupta | |
| 2009/0210491 A1 | 8/2009 | Thakker et al. | |
| 2011/0113029 A1 | 5/2011 | Kaal | |
| 2011/0173270 A1 | 7/2011 | Uchida et al. | |
| 2011/0270609 A1 | 11/2011 | Jones et al. | |
| 2012/0185291 A1 | 7/2012 | Ramaswamy et al. | |
| 2012/0258726 A1 | 10/2012 | Bansal et al. | |
| 2012/0311038 A1 | 12/2012 | Trinh et al. | |
| 2012/0329474 A1* | 12/2012 | Seavey | G06Q 10/1093 455/456.1 |
| 2013/0055113 A1 | 2/2013 | Chazin et al. | |
| 2013/0091205 A1 | 4/2013 | Kotler et al. | |
| 2013/0144603 A1 | 6/2013 | Lord et al. | |
| 2013/0242803 A1* | 9/2013 | Cicic | H04L 65/1069 370/254 |
| 2013/0258908 A1 | 10/2013 | Martinsen | |
| 2014/0140530 A1 | 5/2014 | Gomes-Casseres et al. | |
| 2014/0267559 A1 | 9/2014 | Krantz et al. | |
| 2015/0180821 A1* | 6/2015 | Shapiro | H04L 51/046 709/206 |
| 2016/0093234 A1 | 3/2016 | Tse | |

OTHER PUBLICATIONS

International Preliminary Report on Patentability for PCT/EP2016/054511 dated Sep. 5, 2017.

"Authentication and Supervision: A Survey of Users Attitudes", S.M. Furnell, P.S. Dowland, H.M. Illingworth, and P.L. Reynolds, Computers & Security, 19 (2000) 529-539.

* cited by examiner

COMMUNICATION SYSTEM AND METHOD OF USING THE SAME

CROSS REFERENCE TO RELATED APPLICATIONS

This application is a continuation application of U.S. patent application Ser. No. 15/869,387, which is a continuation application of U.S. patent application Ser. No. 14/637,449.

FIELD OF INVENTION

The present innovation relates to communication systems and methods of using such systems.

BACKGROUND OF THE INVENTION

Communication systems can include devices that may be communicatively connected to each other via wired and/or wireless communication connections. For example, some communication systems can include a server that supports a service that is available to different devices via a network connection, such as an internet connection. Other communication systems can include devices that are communicatively connectable to at least one conference server for use in teleconferences or video conferences. Examples of communication systems can be appreciated from U.S. Pat. Nos. 8,838,152, 8,781,838, 8,645,207, 8,345,665, 8,325,709, 8,279,254, 8,185,086, 8,184,796, 8,169,949, 7,933,955, 7,885,901, 7,672,436, 7,418,084, 7,187,764, and 6,968,179 and U.S. Patent Application Publication Nos. 2004/0198398, 2006/0242235, 2011/0113029, 2013/0055113, and 2014/0140530.

SUMMARY OF THE INVENTION

A communication system can include at least one server computer device; and at least one conference appliance communicatively connectable to the server computer device. The server computer device can be configured so that, in response to receiving a communication from a terminal device relating to a conference communication session, the server computer device is configured to perform at least one of: (i) communicate with a conference appliance or the terminal device to effect a joining of a conference appliance to the conference communication session, (ii) communicate with a communication device to automatically schedule use of resources for the conference communication session based on information included in the communication from the terminal device, and (iii) send information to the terminal device such that a conference appliance is identifiable to the terminal device for the terminal device to establish a connection with that conference appliance for use of at least one service for the conference communication session.

In some embodiments, the communication system can be confirmed so that joining of a conference appliance may be effected by a user of a communication terminal in the same way another human user may be invited to a conference communication session or asked to join such a session using a service hosted by the server computer device. For instance, the conference appliance may be represented as a user and joined as a user to a conference communication session via a graphical user interface for use of the service hosted by the server computer device that may be displayed on a terminal device of a user running an application for the use of that service. The graphical interface for the communication application for this hosted service can be configured so that a user selects a conference appliance to join a conference communication session by providing the same type of input (e.g., click of an icon representing a user and mouse drag of that icon by a pointer along a portion of a displayed graphical user interface to a button or other graphical element) to select that conference appliance as would be required for selecting a human user to join such a session so that such input is provided in the same way a user may select a human user.

In some embodiments, the server computer device can be configured to communicate with a conference appliance to join that conference appliance to the conference communication session and the conference appliance can be configured to validate each conference participant located within a conference room of the conference appliance after being joined to the conference communication session to verify the each conference participant in the conference room is authorized to participate in the conference communication session. The validation of each conference participant can comprise voice validation based on a voice sample recorded from each conference participant and a stored voice sample of that conference participant that was previously recorded. The validation of each conference participant can also, or alternatively, comprise image validation based on an image of each conference participant recorded via the conference appliance and an image of that conference participant that was previously captured and stored.

In some embodiments, the server computer device can be also configured to communicate with a conference appliance to join that conference appliance to the conference communication session and the conference appliance can be configured to set a language setting based on information received from the server computer device or the terminal device. The language setting that is set by the conference appliance can be in response to information received from the terminal device that identifies a language for the language setting based on an evaluation of language utilized in a pre-selected number of communications exchanged with a user of that terminal device via a service hosted by the at least one server computer device (e.g., text messaging, email, instant messaging, etc.). In some embodiments, the server computer device can be configured to send information relating to a number of communications exchanged with the user via the service to the terminal device in response to a request sent by the terminal device to facilitate the terminal device identifying a language setting to communicate to the conference appliance. The information relating to the number of communications exchanged with the user via the service can be analyzable by the terminal device to select a language to which the language setting of the conference appliance is to be set.

In some embodiments, the server computer device can additionally be configured to communicate with the conference appliance to join that conference appliance to the conference communication session such that the conference appliance establishes a connection to the terminal device to provide a screen share service for the conference communication session. The conference appliance can be configured to communicate with the terminal device to display a selected portion of a screen of the terminal device or a portion of a graphical user interface of an application displayed on the screen during the conference communication session.

In some embodiments, the server computer device can also be configured to communicate with a conference appliance or the terminal device to effect a joining of a conference appliance to the conference communication session via a process that comprises: the server computer device responding to a request kw an identification of a conference appliance that is configured to provide the service that is received from the terminal device by identifying, that conference appliance to the terminal device based on information received from the conference appliance when that conference appliance registered with the server computer device, and the server computer device automatically sending a message to the conference appliance to join the communication conference session in response to a message from the terminal device identifying that conference appliance for use of the service.

In some embodiments, the server computer device can be configured to communicate with a conference appliance or the terminal device to effect a joining of a conference appliance to the conference communication session via a process that comprises: the server computer device responding to a request for an identification of a conference appliance that is configured to provide the service that is received from the terminal device by identifying at least one conference appliance to the terminal device based on information received from each conference appliance when that conference appliance registered with the server computer device. The terminal device can be configured to automatically select a conference appliance based on the response from the server computer device and automatically send a communication to the conference appliance to invite the conference appliance to the conference communication session. In some embodiments, the conference appliance can be configured to join the conference communication session and establish a screen share with the terminal device to communicate data for the conference communication session for providing a screen share service based on a portion of a screen of the terminal device during the conference communication session in response to the communication the conference appliance receives from the terminal device that invites the conference appliance to the conference communication session.

The server computer device can also be configured to communicate with a conference appliance to join that conference appliance to the conference communication session and the conference appliance can be configured to receive audio from conference participants within a conference room for the conference communication session and the conference appliance is configured to output audio of the conference communication session in the conference room during the conference communication session. The conference appliance can be configured to communicate with terminal devices of the conference participants within the conference room to deactivate microphones and speakers of the terminal devices during the conference communication session.

A communication system can also include a terminal device, at least one conference appliance that is communicatively connectable to the terminal device via a short range radio communication mechanism, and a server computer device that is configured to provide at least one social network service. The server computer device can be communicatively connectable to at least one of the terminal device and the conference appliance. The terminal device can be configured to communicate with one of the server computer device and the conference appliance to join the conference appliance to a conference communication session for providing at least one service for that conference communication session such that a graphical user interface is displayable by the terminal device to communicate a request to join the conference appliance to the conference communication session in a same way as a human user of the social network service is invited to join the communication session.

In some embodiments, the terminal device can also be configured to determine a location of the terminal device and determine a location of at least one conference appliance, match the determined location of the terminal device with the location of the conference appliance to select a conference appliance closest to the determined location of the terminal device, discover the selected conference appliance via the short range radio communication mechanism, and request the conference appliance to join the conference communication session.

The terminal device can also be configured to communicate with the server computer device to receive information relating to text within messaging exchanged with a user of the terminal device via a service, hosted by the server computer device, analyze the text of the messaging to identify a language setting for selecting a language setting for the conference appliance, and send a message to the conference appliance to select that identified language setting for at least one of audio and visual prompts to be communicated by the conference appliance.

The terminal device can additionally be configured to discover the conference appliance within a preselected time period of a scheduled conference communication session and directly communicate with the discovered conference appliance to join that conference appliance to the conference communication session via the short range radio communication mechanism.

In some embodiments, the conference appliance can be configured to provide a prompt to at least one conference participant within a conference room of the conference appliance to record a voice sample from that conference participant in a conference room of that conference appliance and validate the voice sample with a previously recorded voice sample of that conference participant accessible to the conference appliance: to verify that the conference participant is authorized to be included in the conference communication session. The conference appliance can also be configured to provide an audible warning to at least one conference participant within a conference room of the conference appliance to inform each conference participant that an image of that conference participant is to be captured, effect a capturing of the image after the warning is provided, and compare the image of each conference participant with at least one image that was previously captured of that conference participant to validate the conference participant to verify that the conference participant is authorized to be included in the conference communication session. Additionally (or as an alternative), the conference appliance can be configured to provide a prompt to at least one conference participant within the conference room of the conference appliance to record a voice sample from that conference participant and validate the voice sample with a previously recorded voice sample of that conference participant accessible to the conference appliance to verify that the conference participant is authorized to be included in the conference communication session.

A method of using the communication system is also provided in which an embodiment of the communication system may be used to invite a conference appliance to a conference communication session and/or use a service offered by the conference appliance for such a session. A terminal device that may be configured to communicate with a computer server device that may host a service is also provided. The terminal device may have an application on a non-transitory machine readable medium that, when executed by the terminal device, allows an embodiment of the method to be run. For instance, the terminal device may be configured such that a graphical user interface is displayable by the terminal device to communicate a request to join the conference appliance to a conference communication session to a server computer device in the same way as a human user of the social network service is invited to join the conference communication session. Embodiments of a non-transitory, tangible, computer readable medium having a program code that defines an embodiment of a method are also provided. An embodiment of such a medium can include an application that is configured so that a graphical user interface is displayable by a terminal device that is usable by a user of that device to communicate a request to join a conference appliance to a conference communication session to a server computer device in the same way as a human user of a social network service is invited to join that conference communication session.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary communication apparatuses and communication systems are shown in the accompanying drawings and certain exemplary methods of practicing the same are also illustrated therein. It should be understood that like reference numbers used in the drawings may identify like components.

DETAILED DESCRIPTION OF EXEMPLARY EMBODIMENTS

Figure 1:
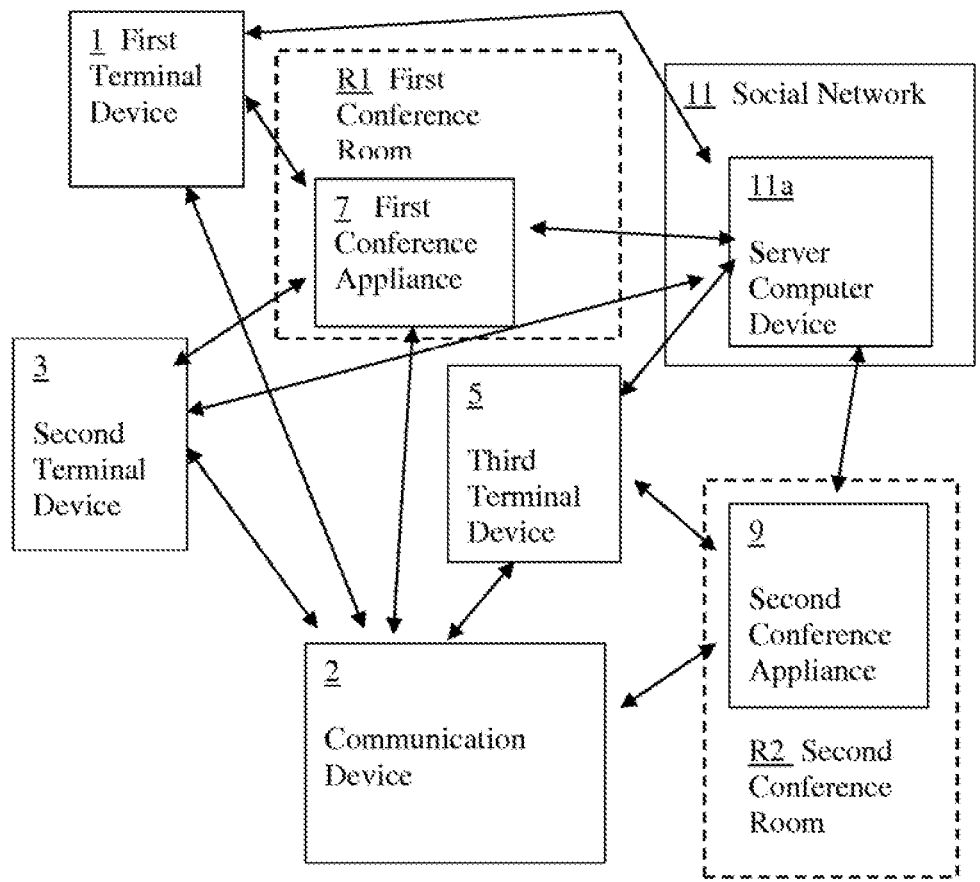
FIG. 1 is a block diagram of a first exemplary embodiment of a communication system. Conference rooms in which communication appliances and other equipment may be positioned for providing conference related communication services are shown in broken line in FIG. 1.

As may be appreciated from FIG. 1-11, a communication system can include a plurality of terminal devices that are communicatively connectable to a social network 11. The terminal devices can include a first terminal device 1, a second terminal device 3, and a third terminal device 5. For instance, each terminal device may be a communication endpoint device, a laptop computer, an electronic tablet, a smart phone, a personal digital assistant, a personal computer, a mobile personal computer device, an internet appliance or another type of communication terminal.

The social network 11 can be hosted by at least one server device 11a. For instance, the social network can include one or more servers configured to host website services or other types of communication services and one or more servers configured to host application program interface (API) services. The social network 11 can also include other nodes that help support one or mare services offered by the social network. The social network 11 may provide services available to the terminal devices via an enterprise network connection or local area network connection. In addition, or as an alternative, the social network 11 may be configured to provide services to the terminal devices and other devices via another type of connection, such as an internet network connection or a wide area network connection.

The communication system can also include conference communication session resources that can help support a teleconference communication session in which parties communicate with each other via the transmission of audio, a video conference communication session in which parties communicate with each other via the transmission of video and audio, or a workshare communication session in which video and/or audio data are exchanged between multiple parties while those parties work on preparing or revising at least one document that is displayed to the different parties of the conference as they work on that document or a screen share communication session in which a display of a screen of a user's terminal device is communicated to at least one remote device of a communication session participant so that the display of that screen is also shown to that remote participant (e.g. a screen illustrating a graphical interface displayed on a particular mobile terminal device, a presentation document running on a terminal device, or other type of image, video, or application session graphical display being shown on the terminal device's screen).

In some embodiments, the communication system can include a plurality of conference appliances and at least one conference call communication server computer device or other type of communication device 2 that can be configured to support video conference, workshare conference, and/or audio conference communication sessions. For example, the communication system can include a communication device 2 for supporting conference communication session services, a first conference appliance 7 that can be located in a first conference room R1 (shown in broken line in FIGS. 1 and 11) and a second conference appliance 9 that is located in a second conference room R2 (shown in broken line in FIG. 1). The second conference room R2 can be remote from the first conference room R1. For instance, the first conference room R1 can be in a first having a first geographical location located in the first building and the second conference room R2 can be in a different room in this first building. As another example, the second conference room can be in a second building having a second geographical location that is spaced apart from the geographical location of the first building (e.g. has a different mailing address, is located in a different country or region of a country, etc.). The first and second conference appliances 7 and 9 can be communicatively connectable to at least some of the terminal devices and/or the server computer device 11a of the social network 11. Embodiments of the communication system can also include other communication devices and conference appliances.

Embodiments of the communication system may also include other devices. For instance, the communication system can include a plurality of subnetworks that each includes different nodes such as gateways, border control elements, switch devices, and branch exchange devices. Each subnetwork may be a local area network component of a large network or wide area network, for example.

The terminal devices, conference appliances, communication device and server computer device are each electronic devices having hardware elements such as a processor unit, non-transitory memory, and at least one transceiver unit. The social network 11 can include other electronic devices in addition to at least one server computer device that are configured to support services or host services provided by the social network 11.

Figure 2:
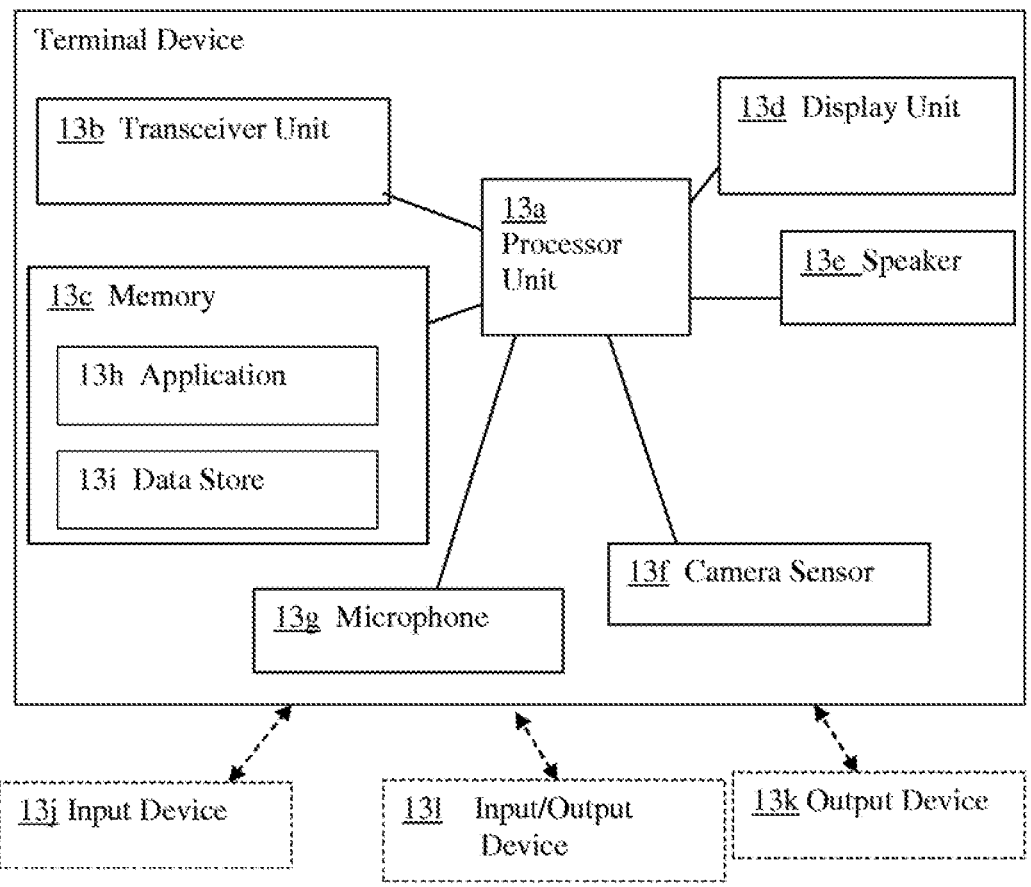
FIG. 2 is a block diagram of an exemplary embodiment of a terminal device of the first exemplary embodiment of a communication system.
Figure 3:
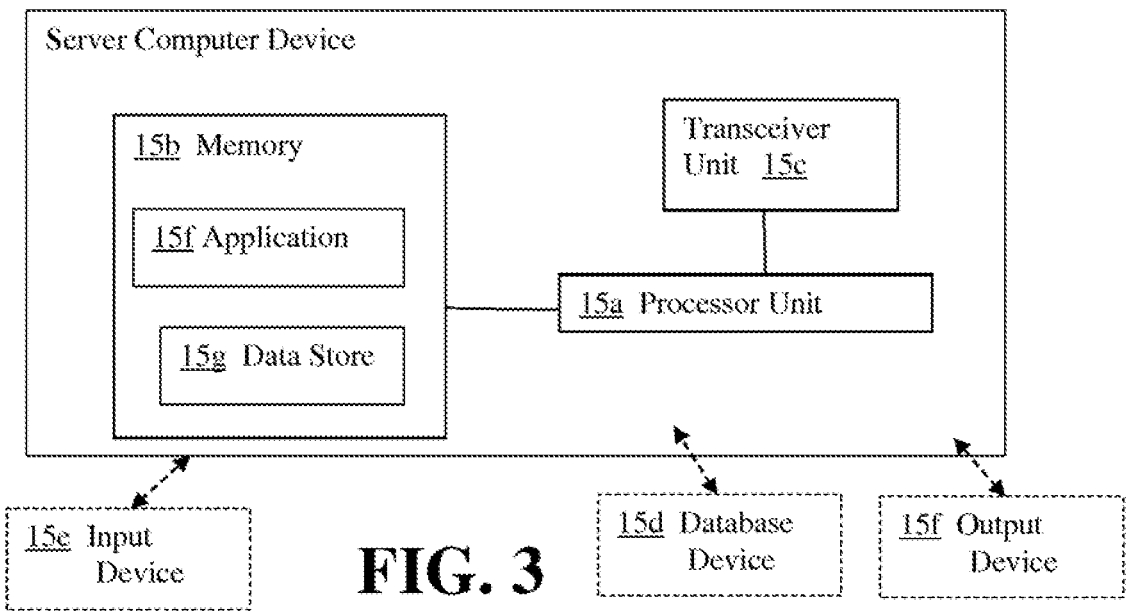
FIG. 3 is a block diagram of an exemplary embodiment of a server computer device of the first exemplary embodiment of a communication system.

For example, as can be seen from FIG. 2, each terminal device can include a number of different hardware elements. In some embodiments, a terminal device can include a processor unit 13a that is communicatively connected to at least one transceiver unit 13b, non-transitory, tangible memory 13c, a display unit 13d, at least one speaker 13e, at least one camera sensor 13f, and at least one microphone 13g. The processor unit 13a can include a microprocessor, a central processing unit, a processor core, interconnected processors, or other type of hardware processor device. The transceiver unit 13b can include at least one receiver and at least one transmitter. In some embodiments, the transceiver unit 13b can include multiple different transceivers such as, for example, a transceiver for short range radio communications, a transceiver for connecting to a router device in a local area network, and a transceiver for connecting to a base station of a wireless wide area network (e.g. a cellular transceiver unit). The memory 13c can be flash memory, a hard drive, or other type of computer readable medium that is tangible and is configured to store electronic data thereon. For instance, the memory 13c can have at least one application 13h and at least one data store 13i stored thereon. Each application 13h can include: a program defined by code that is executed by the processor unit so that the terminal device performs a method defined by the code of the program. Each data store 13i can include a database or other document or file that can be accessed when the code of the program is being run. The display unit 13d can be a liquid crystal display, a touch screen display, a monitor, or other type of display device. The speaker 13e can be configured to emit audible output and the microphone may be configured to receive audio input from a user, such as receiving spoken words a user may say. Each camera sensor 13f can be configured to record a video and/or a snapshot or photograph. Each terminal device can also be configured for connecting to at least one input device 13j, at least one output device 13k, or at least one input/output device 13k. For instance, a keyboard, pointer, touch screen display, monitor, television, printer, fax machine, scanner, or other type of input and/or output device can be connected to the terminal device for providing input to the device or for outputting data.

In some embodiments, the server computer device can be configured as a workstation or other type of server computer device that is configured to host one or more services to multiple different user devices or terminals. For instance, as can be appreciated from FIG. 3, the server computer device can include hardware, such a processor unit 15a that is communicatively connected to non-transitory memory 15b and a transceiver unit 15c. At least one input device 15e and/or at least one output device 15f can also be connected to the server computer device. At least one database device such as a database server computer device can also be communicatively connected to the server computer device. The processor unit 15a can be a hardware processor such as a central processing unit, a microprocessor, a core processor, or other type of hardware processor element. The transceiver unit 15c can include at least one transmitter and at least one receiver. The memory 15b can be a tangible non-transitory computer readable medium such as a hard drive, flash memory, or other type of storage device. The memory can have at least one application 15f and at least one data store 15g stored therein. The application 15f can include code that defines a method that is performed by the server computer device when the application is run by the processor unit 15a. Each data store 15g can include data that is utilized when the application is run by the processor unit 15a. For instance, the data store 15g can include a database of user profiles that includes username, password, contact information, email address, instant message address, telephone number, a user image file of an age of the user that was captured prior to or during registration with the service provided by the server computer device, a user voice sample file of an audio voice sample of the user that was recorded during or after registration with the service provided by the server computer device, and other information for each user that is registered with the social network 11 for use of and/or participation in social network services.

Figure 4:
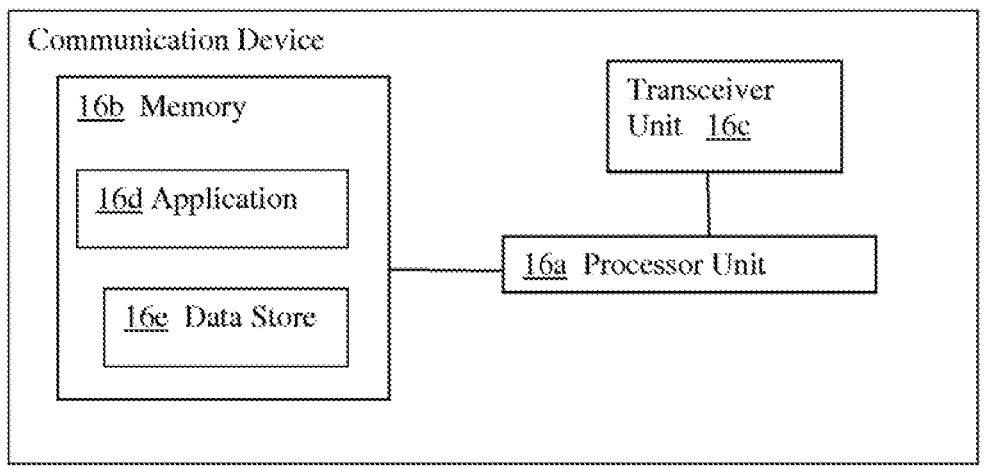
FIG. 4 is a block diagram of an exemplary embodiment of a communication device of the first exemplary embodiment of a communication system.
Figure 5:
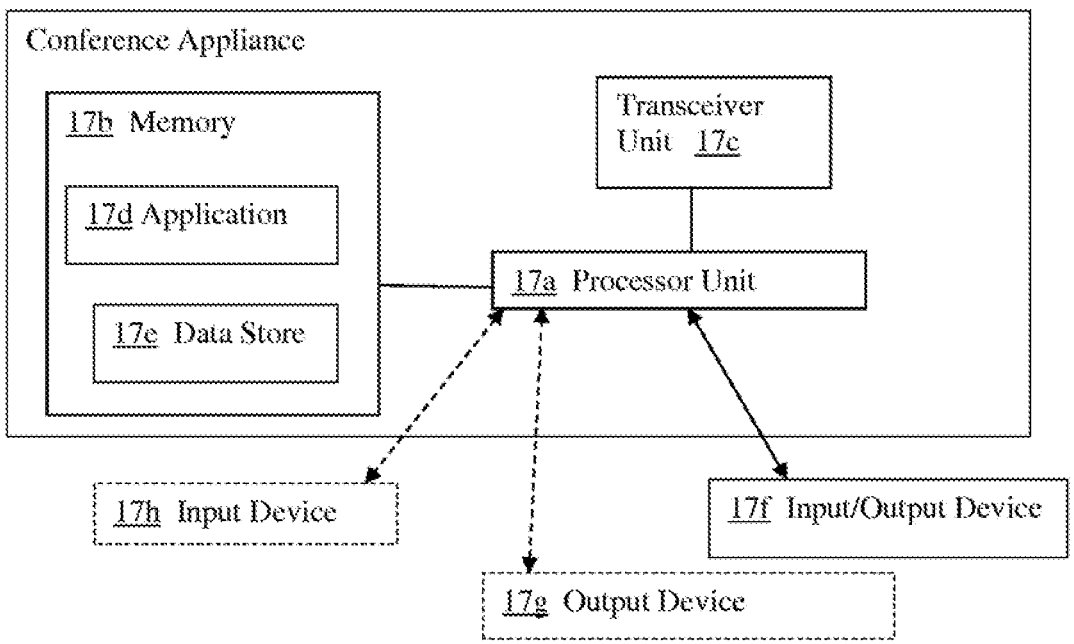
FIG. 5 is a block diagram of an exemplary embodiment of a conference appliance of the first exemplary embodiment of a communication system.

As can be seen from FIG. 4, the communication device 2 can be an electronic device that is configured to facilitate communications between terminal devices and other devices or can be configured to host one or more services provided to terminal devices. The communication device can include a processor unit 16a that is communicatively connected to non-transitory memory 16b and at least one transceiver unit 16c. The memory 16b can include at least one application 16d and at least one data store 16e. The memory 16b can be flash memory, a hard drive, or other type of computer readable medium that is tangible and is configured to store electronic data thereon. For instance, the memory 16b can have at least one application 16d and at least one data store 16e stored thereon. Each application 16d can include a program defined by code that is executed by the processor unit so that the terminal device performs a method defined by the code of the program. Each data store 16e can include a database or other document or file that can be accessed when the code of the program is being run.

Each conference appliance is also an electronic device having hardware. Each conference appliance can be configured to support at least one conference communication session service. For instance, a conference appliance can be configured as a type of device that includes or is connected to at least one of a camera device, a video camera device, a camera sensor, a conference phone device, a speaker device, a speaker array, a microphone device, a microphone array, at least one display device, or a screen share supporting device or can be configured as an electrical device that is configured for communicative connection to such input and/or output devices via wired and/or wireless communication connections. As can be appreciated from FIG. 5, each conference appliance can include a processor unit that is communicatively connected to non-transitory memory 17b and at least one transceiver unit 17c. The transceiver unit 17c can include at least one receiver and at least one transmitter. The memory 17b can be flash memory, a hard drive, or other type of computer readable medium that is tangible and is configured to store electronic data thereon. The memory 17b can have at least one application 17d and at least one data store 17e stored thereon. Each application 17d can be defined by code that is executed by the processor unit 17a so that the conference appliance performs a method defined by the code of the program. Each data store 17e can include a database or other document or file that can be accessed when the code of the application is being run. The conference appliance can also include at least one input/output device 17f that is communicatively connected to the processor unit 17a, at least one input device 17h that is communicatively connected to the processor unit 17a and/or at least one output device 17g that is communicatively connected to the processor unit 17a. For instance, at least one camera sensor, at least one microphone, at least one speaker, at least one touch screen display, at least one monitor, and/or at least one television can be included in the conference appliance or can be communicatively connected thereto as a component of the conference appliance via a wired or wireless connection such as an wired connection, a cable connection, a High-Definition Multimedia Interface (HDMI) wired connection, Digital Visual Interface (DVI) connection, a mini-display connection, a video graphics array (VGA) connection, a universal serial bus (USB) connection, a direct short range radio connection (e.g. a Bluetooth connection), or other type of communication connection.

For example, the first conference appliance 7 located in first conference room R1 can be connected to a first display device 31 for providing a video conference display, a second display device 33 for providing a screen share display, a microphone array 35 for receiving audible input, a speaker array 37 for output of audio, and a camera sensor 39 that can be configured to capture an image of one or more people and also capture video for use in providing that video data for transmission of that video for a video conference communication session. All of these input and/or output device can be located within the first conference room R1. The first conference appliance 7 can be communicatively connected to each of these devices via wireless or wired communication connections between these devices and the conference appliance's transceiver unit. The first conference appliance 7 can also be configured to be connected to a data network 21 for establishment of communication connections to a social network 11 and/or terminal devices (e.g. first and second terminal devices 1 and 3) via its transceiver unit as may be, appreciated from FIG. 11. The first conference appliance 7 can also be communicatively connectable to first and second terminal devices via a short range radio connection (e.g. Bluetooth connection) or other local connection mechanism (e.g. USB connection, etc.) via its transceiver unit as indicated by broken line in FIG. 11.

As may be appreciated from the exemplary methods illustrated in FIGS. 6-10, embodiments of the communication system can be configured to facilitate a number of different conference communication session related uses. For example, the communication system can be configured to permit a user to schedule a conference communication session and reserve resources for that session by use of only one interface provided at least in part by an application run on a terminal device of that user. In some embodiments, the communication system can be configured so that joining of a conference appliance may be effected by a user in the same way another human user using a service hosted by the communication system may be invited to a conference communication session or asked to join such a session. For instance, the conference appliance may be represented as a user and joined as a user to a conference communication session by a social network hosting a social network service or communication service. The graphical interface: of the social network service or c communication service for the communication application for this hosted service can be configured so that a user selects a conference appliance to join a conference communication session by providing the same type of input to select that conference appliance as would be required for selecting a human user to join such a session so that such input is provided to a server computer device hosting, the service in the same way a user may select a human user. In some embodiments, the graphical user interface provided on a terminal device running the application for use of this service can be configured so that a selection of an con representing a user and drag of that icon by a pointer (e.g. a stylus, mouse, a human finger touching and sliding along a touch screen, etc. along a portion of a displayed graphical user interface to a button or other graphical element to select that conference appliance as would be required for selecting a human user to join such a session so that such input is provided in the same way a user may select a human user by use of the service. In other embodiments, the selection and joining of users (and the conference appliance that is represented as a user) may be made via a calendar of a graphical user interface or other display element of a graphical user interface of a communication application being run on a terminal device for use of a service offered by a server computer device. For social networks that may be configured for use by a particular corporate entity's employees, such a configuration can allow the employees to know how to schedule conference session resources by use of an interface that they may routinely use when working without having to be trained to use any type of special application or special process.

As another example, the communication system can be configured to facilitate conference appliance detection and usage for different communication sessions. The conference appliances may be utilized for different services, such as, for example, providing audio and/or video transmission services for the conference communication session, validating that all users participating in a communication session from a particular conference room are authorized to be participating in the session, and/or providing screen share services. The communication system can also be configured to facilitate other services, such as setting a language setting for voice, text or audio prompts an appliance may make when in use for a conference communication session.

Embodiments of the communication system can be configured to support multiple different conference appliances within multiple different rooms of one or more office locations. For example, embodiments of the communication system can be configured so that a user is able to automatically join a voice conference, a video conference, a workshare conference, or a screen share conference from a conference room equipped with at least one conference appliance after that room was reserved for the conference by use of a service that may be available via an application stored on the memory of the user's terminal device. Embodiments of the communication system can be configured so that a user may need to bring his or her terminal device with that user to the conference room to initiate the automatic joining to the conference. The conference appliance may be joined to a communication session so that the conference appliance is allocated for use during a conference communication session prior to all conference participants having a video and/or audio conference connection established so that the conference appliance can form connections to at least one terminal device located in the conference room of that conference appliance prior to video and/or audio communication links being established via a communication device (e.g. a conference call server, etc.) for the conference communication session. As another example, a conference appliance may be joined to a conference communication session prior to the activation of an audio link and/or a video link for the conference communication session that may be activated via a communication device (e.g. a conference call server) so that the conference appliance is able to perform conference participant validation services to ensure only authorized conference participants within the conference room of the conference appliance are present prior to the activation of that conference communication link that permits all conference participants into the conference communication session located in different remote locations from exchanging audio and/or video communications.

A conference appliance within the reserved room for the conference can be configured to validate that the user is authorized to join the conference by use of a validation process. The validation process can include a face recognition match and/or a voice recognition match. Additionally, the language selected for visual prompts, audible announcements, and the voice recognition process can be automatically set based on a determined predominant textual content of posts or other messages sent by the user via the social network 11 and/or via the user's terminal device utilizing communication services provided by the social network 11 (e.g. instant messaging, email, text messaging, or other communications of textual content involving the user). The automatic setting of the language setting, of the conference appliance can allow a conference session to be started more quickly and can also allow a conference appliance to be easily used in situations where the language of users varies substantially from the default of the appliance (e.g. a Latin based language such as Spanish or French language of the users and a default appliance language that has a non-Latin origin such as Chinese, Korean, or Japanese).

Figure 6:
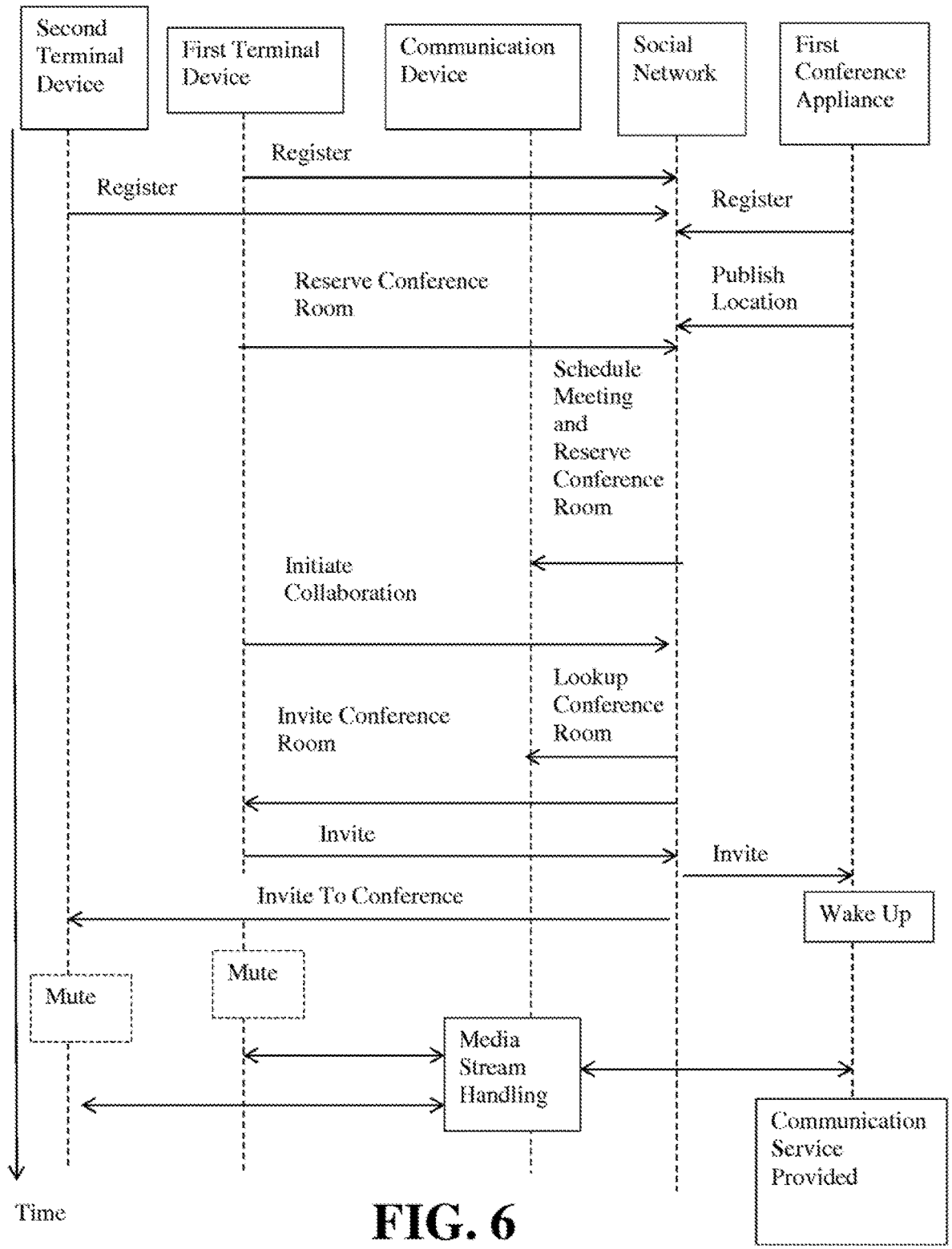
FIG. 6 is a schematic flow chart illustrating an exemplary method of using the first exemplary embodiment of a communication system to schedule and participate in a conference communication session.

Referring to FIG. 6, an embodiment of the communication system can be configured so that multiple terminal devices of different users register with a social network 11. For instance, each terminal may download an application or otherwise have that application stored in its memory and subsequently run that application to communicate with a server computer device 11a that hosts services offered by the social network 11 via an interface provided by the terminal device running the application. Registration can also be effected by a username and password being established for a user and having that information communicated to a server computer device of the social network for storage so that the user can be associated with that information when trying to utilize social networking services via the user's terminal device running the application. The username may be a string of characters, such as a terminal device phone number, email address, or other type of address or name. The password can be a string of characters or include other data. After registration, the user's terminal device may send username and password information as well as any other authentication information to the server computer device to establish a connection to the social network for use of one or more social networking services automatically upon activation of the application that is stored on the user's terminal device for use of such services. Alternatively, the user's terminal device may be configured to require the user to manually input such information for sending to the server computer device before establishing such a connection to the social network for use of one or more social network services.

At least one conference appliance can also send one or more communications to the server computer device 11a or other element of the social network to register with the social network. Thereafter, or during the registration, the conference appliance can send a message to the social network (e.g. a server computer device 11a) to publish a location for the conference appliance. The location information can include data that identifies a geographical location of the conference appliance, a building or room in a building in which the conference appliance is located, or other location information that identifies a particular location of the conference appliance. The location information can also include its network address (e.g. a media access control ("MAC") address or Bluetooth address) or an identification of a network access point to which it is connected for being communicatively connected to the social network 11 (e.g. a service set identifier ("SSID") or other type of access point identifier).

Thereafter, a user associated with the first terminal device can provide input to the social network via an interface defined by the application being run on the first terminal device 1 to send a message to the server computer device 11a for reserving a conference room for a conference communication session that may involve other users, such as the user of the second terminal device 3 and a user of the third terminal device 5. A server computer device of the social network may respond to the reservation request received from the first terminal device to schedule a meeting and reserve at least one conference room for the conference session via communications with at least one communication device 2 such as a conference call server device. The scheduling and conference room reservation may be effected to cause the conference call server device to reserve conference communication session resources, such as conference rooms and/or conference appliances so that these resources are available for the conference communication session when that session is scheduled to occur. In some embodiments, such as a scheduled conference session that is to be held among users that are employees of the same company who may be located in multiple different offices, the scheduling may result in reserving conference rooms in different locations for different users who are to participate in the conference session. The communications with the social network 11 can also result in the server computer device of the social network causing schedules associated with the users to be invited to the conference session being updated to include information identifying the scheduled conference session and a room for the conference session that is assigned to each user based on scheduling of the meeting and reservation of conference rooms that is performed by the server computer device 11a of the social network 11. In some embodiments, the updating of the schedule may be performed at the server computer device. In other embodiments, such updating of the scheduling may be caused by the server computer device sending a message to a calendar server computer device or other device that manages calendars for different users to have the schedules for the different users updated.

At the time of the scheduled conference communication session, the user of the first terminal device may bring, his or her terminal device to the reserved conference room or other location to initiate the communication session. Thereafter, the user may cause the first terminal device to initiate collaboration with the other users via the conference communication session. The initiation of the collaboration may be initiated by the user providing input to his or her first terminal device 1 to send a message to the server computer device 11a to initiate the collaboration. The social network 11 may communicate with the communication device 2 in response to the message seeking to initiate collaboration received from the first terminal device to identify the conference room and other conference resources assigned to this collaboration. Once that information is received from the communication device 2 in response to the request for such information, the server computer device of the social network 11 may send a query to the first terminal device 1 to determine whether the conference room and/or conference appliances associated with that room should be invited to the conference session. The first terminal device 1 may respond to that query based on input received from its user by sending a message to the social network to invite at least one conference room appliance.

That input may be provided by the user manipulating a pointer, a touch screen display, or other input device to select indicia presented to the user via an interface for the social network defined by an application run on the first terminal device. That indicia may be a displayed button or other indicia that is selectable to invite the applicable conference appliance(s), for example. In some embodiments, such input may be provided via a graphical user interface displayed via the first terminal device running an application for use of the service provided at least in part by the server computer device 11a such that a selection of an icon representing a user and/or dragging of that icon by a pointer (e.g. a stylus, mouse, a human finger touching and sliding along a touch screen, etc.) along a portion of the displayed graphical user interface to a button or other graphical element to select that conference appliance is performed in the same way as would be required for selecting a human user to join the conference communication session and/or be invited to such a session so that such input s provided in the same way, a user may select a human user to join a conference communication session. The server computer device 11a may send a message to the conference appliance of that conference room to invite the conference appliance to the conference session in response to receiving the instruction from the first terminal device to join the applicable conference appliance(s). The invitation for joining the conference appliance can also include information for setting the language in the conference appliance for identifying the language that is to be used for voice, text, and audio prompts and other audio and textual communications that may occur during the conference session. Each conference appliance associated with the conference room can be activated from a sleep mode or deactivation state in response to such an invitation so that at least one service is providable via that conference appliance (e.g. video, audio, and/or screen share services). If language information is included in the invitation, the conference appliance may also set its language setting based on that language information. The server computer device 11a can also send a message to the first terminal device 1 and to terminal devices of other users to invite those terminal devices and/or users of those terminal devices to the conference communication session.

After being invited to the conference session, the terminal devices may respond to the invitation and join the conference communication session by automatically muting their microphones and/or deactivating their speakers to avoid causing any type of feedback loop issue or other issue with the microphones and speakers of the conference appliance. After becoming awake, the conference appliance may subsequently begin providing a communication service for the conference session. This service can include activation of at least one speaker and at least one microphone that are in the conference room that are part of the conference appliance or are communicatively connected to the conference appliance. The service can also include actuation of one or more display devices of the conference appliance or that are communicatively connected to the conference appliance. For instance, an array of microphones and an array of speakers may be activated to provide audio transmission related services for the conference session, at least one camera sensor may be activated to provide video recordation services for the conference session, a first display can be activated to provide video output services to show other conference session personnel joining the conference from other locations remote from the conference room, and at least one other display can be activated to provide share screen services for having a portion of an active screen of a terminal device of a user that is being displayed by that user's terminal device also displayed on the display in the conference room as well as on other displays located in the other conference rooms for display to the other conference participants in those other locations. The audio, video, and other data for such services may be communicated to the communication device 2 via the conference appliance for media stream handling. For instance, the communication device 2 may receive the video and audio data from the camera sensor and microphones via the conference appliance for mixing with other media streams received from other conference participants for outputting such content to the different locations' conference room conference appliances for the conference session. As another example, the screen sharing data can also be sent from the conference appliance to the communication device for communication of that data to other conference appliances for displaying that screen portion at the other conference room locations.

In some embodiments of the communication system, all the communications exchanged between the social network, terminal devices, conference appliances, and communication device may only e passed through one data network so that no additional connectivity is required to enable such functionality. In other embodiments, communications may traverse multiple different data networks or a data network and other type of network.

The scheduling of conference room resources and use of conference appliances can be configured so that a user does not have to connect any type of cable or other physical wire or physical communication link connector between his or her terminal device and an appliance for use of any conference communication session service. Further, embodiments of the system can allow the user's terminal device interface that he or she is accustomed to be used for scheduling of a conference and use of those resources so that a user need not be trained to have to know how to navigate multiple other interface environments. For instance, the graphical user interface displayed by the user's terminal device for inviting human users to a conference session may be configured to represent conference appliances as users of the service so that a conference appliance may be invited to a session or joined to a session by input to be provided by a user in the same way a human user of the service is invited and/or joined. The conference appliance may be automatically discovered by the user's terminal device for being invited to the conference session or may be looked up by the user's terminal device for selecting the appliance for joining such that the user can activate and/or control the selected conference appliance when near that appliance and/or from a remote location that is spaced apart and relatively far away from that appliance.

The language settings for the conference appliances to be used in a conference session can also be configured to occur automatically so that a selected language for visual and audio related prompts to be emitted via the conference appliance is automatically selected to a desired language without a user having to make any type of manual selection. For example, in some embodiments a first terminal device of a user that scheduled the conference session and/or initiated the start of the conference session and/or a collaboration session of the conference session can be joined to the conference session. That user's terminal device can also receive data from the social network 11 that identifies the conference appliance for that user's conference room or can be configured to directly detect the conference appliance within that room. After the user's terminal device is aware of that conference appliance, the terminal device of the user can be configured to send a message to that conference appliance for requesting a language setting for visual and audio prompts that may be emitted by one or more display devices and/or speakers that are connected to the conference appliance and/or are a part of the conference appliance. In response to such a request, the conference appliance may change its language setting from a default value to the language identified in the request. But, if the requested language is the default language, no such change would be made by the conference appliance as the default language would have already been set. After a conference session ends, the conference appliance may detect such an ending and subsequently return the language for resetting the language for audio and visual prompts to its default value.

Figure 7:
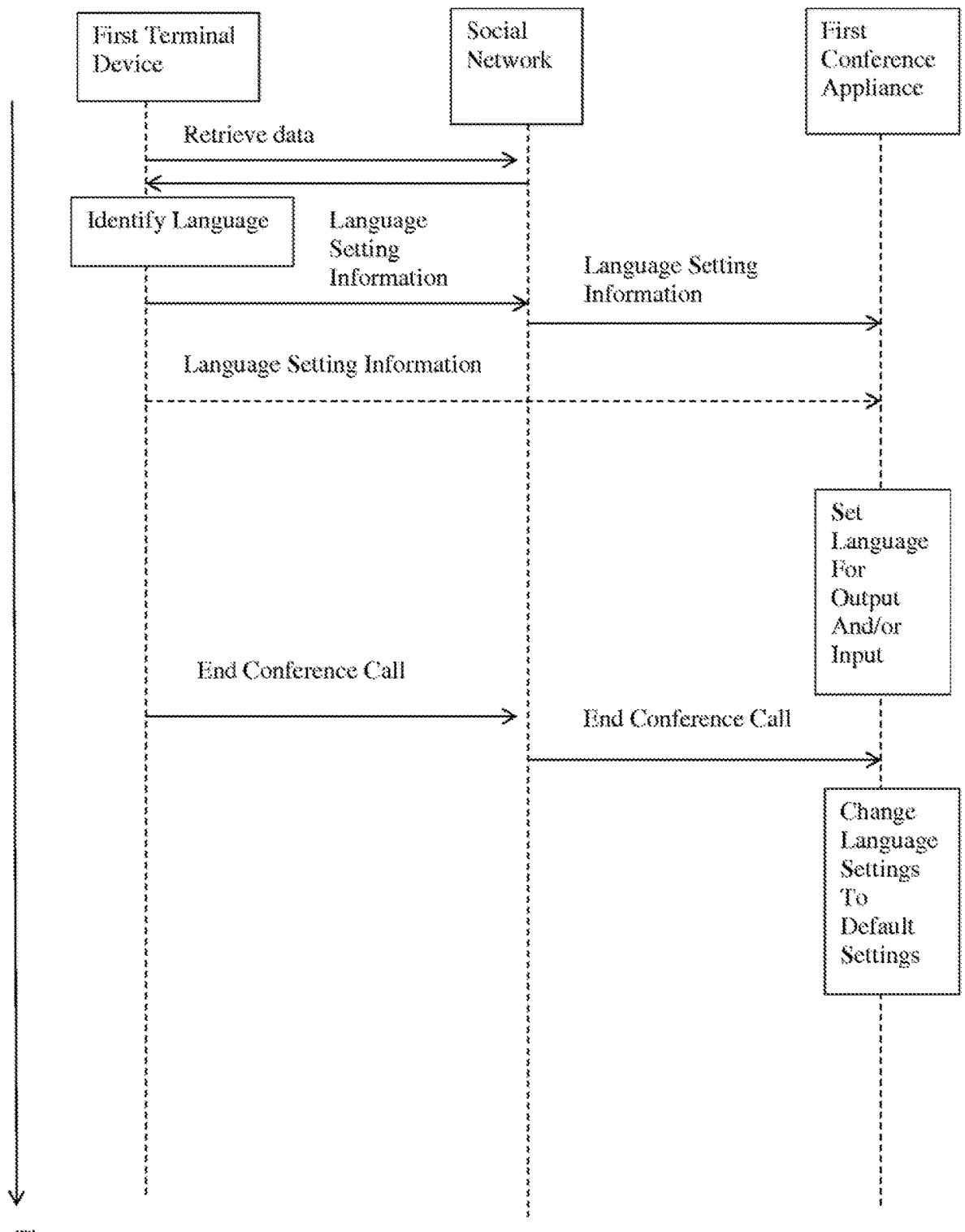
FIG. 7 is a schematic flow chart illustrating an exemplary method of using the first exemplary embodiment of a communication system to schedule and participate in a conference communication session to select a language setting for a conference appliance of the communication system.

Examples of such automatic language selection can be appreciated from FIG. 7. For instance, prior to or during the joining to a conference session, initiation of the conference session, or initiation of a collaboration session after the conference session is started, a user's terminal device can be configured to evaluate the language used in a pre-selected number of textual communications sent by the user and or exchanged with the user via a service of the social network 11. To perform such an evaluation, the user's terminal device can evaluate messages stored in the memory of the terminal device and can also communicate with the social network to retrieve communications sent by the user via the social network 11. For example, the terminal device of the user may send a request message to the server computer device of the social network to retrieve posts within a pre-selected time range and the social network 11 may respond to that request by sending data relating to those posts. The data can include the text from previous communications exchanged between the user of the terminal device and other users via the social network 11. For instance, the data retrieved from the social network 11 and/or communications data stored in the memory of the terminal device can include past email messages, text messages, instant messages, social network messaging, or other text communications exchanged between the user and others. The messages that are to be evaluated may be selected based on a pre-selected time range (e.g., within 10 days of the occurrence, within 2 weeks of the occurrence, etc.) and/or a pre-selected threshold number of communications (e.g. the last 25 communications exchanged involving the user, the most recent 20 posts exchanged with the user, etc.). These selected messages may also (or alternatively) be searched such that only messages having a subject that corresponds to a subject for the conference session are evaluated based on information about the conference session that identifies the one or more topics of the conference session. The communications can be evaluated to determine the language of each message. The language from those messages can then be identified in a request to be sent to the conference appliance for setting the language for video and audio prompts that may be communicated by an output device connected to the conference appliance.

The terminal device can be configured to evaluate communications for selecting a predominant language to identify that language to a conference appliance for setting that conference appliance's language setting a number of different ways. For instance, a language for the majority of the evaluated communications can be the language that is identified for including in the language selection request. As other examples, the language used in the greatest number of communications or the language for the largest portion of the text of the evaluated communications can be identified for including in the language selection request. As yet another example, the predominant language as determined from a statistical mean from the evaluated communications can be the language that is identified for including in the language selection request.

The request for setting the language for the conference appliance can be sent from the terminal device to the conference appliance via the social network 11 or directly as illustrated in broken line in FIG. 7. In a direct communication, the request for setting the language can be sent to the conference appliance via a Bluetooth connection or other direct communication connection. For communicating the request for the language setting via the social network, the terminal device can send the request to the server computer device 11a of the social network 11 and the server computer device 11a may subsequently forward that request to the conference appliance or may send a language setting message to the conference appliance that is based on the request received from the terminal device to effect the change in the language setting. The conference appliance may have previously registered with the social network 11 so that the server computer device 11a already has information needed for sending such a language setting request to the conference appliance.

In some embodiments, the user's terminal device can be configured so that it starts to try to discover the conference appliance prior to the time a conference communication session is scheduled to begin. For example, calendar data for the user can be stored on the terminal device and the terminal device can be configured to start attempting to discover a nearby conference appliance via a short range radio connection (e.g. Bluetooth) or other detection mechanism a pre-selected time period prior to the start of that scheduled conference. For instance, within one minute, within five minutes or within ten minutes of a scheduled conference communication session, the use's terminal device may send at least one message via a short range radio transmitter to attempt to find a nearby conference appliance that may respond to that message to initiate discovery of the conference appliance to the terminal device. As another example, within the pre-selected time period, the terminal device may send a message to the social network 11 to discover the conference appliance in the conference room to which the user is scheduled to be within for the conference session and subsequently send a communication to the conference appliance to set the language to a desired setting for the scheduled conference. In some other embodiments, the information for setting the language can also be included in the message sent to the social network 11 to invite the conference appliance to join a conference communication session. In some embodiments, the server computer device 11*a* of the social network can be configured so that information for setting a language of a conference appliance is only sent to the conference appliance when the identified language differs from the default language of the conference appliance to preserve bandwidth resources and other resources.

In response to receipt of the request for setting the language, the conference appliance may set the language for use in outputting of prompts or displaying text. In some embodiments, the language setting can also be configured to affect how the conference appliance may interpret text communicated to the conference appliance via input messaging sent to the conference appliance from the users terminal device or the server computer device 11*a* of the social network 11. If the conference appliance has a default language setting for such output of data and/or interpretation of input data, the conference appliance, may be configured to only change from the default setting if the language identified in the request differs from the default setting. After the conference session is determined to be completed, the conference appliance may then return the language setting back to a default value. After returning the language setting to its default value, the conference appliance may stay on or be configured to enter a sleep mode, or a reduced power consumption mode to be available for use in another conference that is scheduled for the room.

Embodiments of the communication system can also be configured to validate conference participants as a security measure. For instance, as can be appreciated from FIG. 9, embodiments of the communication system can be configured to perform a conference participant validation for each participant to a conference session at the time the conference session is started as a security measure to ensure that only invited conference participants are included in the conference session. The conference validation process may occur after the language setting has been set by the conference appliance based on language setting information received from a user's terminal device when the conference appliance was invited to the conference session or when the conference appliance was otherwise discovered by the user's terminal device.

In some embodiments, a conference appliance that has joined a communication conference session or that is activated and located in the room in which a conference communication session is being held can be configured to request a voice sample for validation that the conference participants in the room are all authorized to be included in the conference session. Each conference room for the conference communication session can have a respective conference appliance that is configured to facilitate such a validation.

In the selected language, at least one speaker of the conference appliance can emit a voice prompt that requests a particular conference participant scheduled to be in the room in which that conference appliance is located to provide a voice sample for use in validation. Thereafter, the user may respond to the voice prompt by directly speaking in the room so that at least one microphone of the conference appliance can record the user's audible voice sample. As another alternative, the user may speak directly into a microphone of the user's terminal device for sending, a voice sample to the conference appliance via a direct connection (e.g. wireless Bluetooth connection) or via a network connection (e.g. via the social network 11). As yet another alternative, the user's terminal device may have a pre-recorded voice sample stored in its memory and be configured to send that audio file having this sample to the conference appliance for responding to the prompt output by the conference appliance.

After receiving the voice sample, the conference appliance can be configured to perform a voice recognition process on the voice sample received from the conference participant for participation in the conference communication session. That voice recognition process can be configured to compare the current voice sample received from the conference participant with a previously recorded voice sample for that conference participant. For instance, the voice sample recognition can be a voice fingerprint match that is based on a previously recorded voice sample that is accessible to the conference appliance for that particular conference participant. That prior voice sample used by the conference appliance can be an audio file that is downloaded in the memory of the conference appliance from the social network 11, a voice message system, or from another device that is communicatively connected to the conference appliance. For instance, in some embodiments the prior voice sample file for each participant can be a voice sample audio file that is stored as part of a user's profile data that is included in a data store of the server computer device 11*a* of the social network 11 or is a voice record used for the user's voice mail prompt. The voice sample file that is part of the user's profile can be a previous audible statement made by the user that was recorded via the server computer device 11*a* of the social network 11 via a connection that device had with the user's terminal device to create that audio file. As another alternative, the recorded audio data of the previously recorded audible statement may have been previously created by the user's terminal device and subsequently sent to the social network 11 or server computer device 11*a* of the social network 11 for saving in a data store along with other data for the user's profile (e.g. user's name, address, password, contact information, social network account information, etc.).

After the voice recognition is validated, the conference appliance may emit another audible prompt via one or more speakers and/or a visual prompt via a display device to form one or more conference room participants that a video, snapshot, photograph, or other type of visual image is to be captured or otherwise recorded for use in providing an image verification for one or more of the conference participants that intend to participate in a conference communication session in the room of the conference appliance. After the warning is emitted, one or more camera sensors may be actuated via the conference appliance to capture video or a snapshot or other image of one or more conference participants. Face recognition or other visual recognition processes may then be performed to compare the captured image(s) of the conference participant(s) with images of the conference participants that are within user profiles for those participants or that are stored in the memory of the conference appliance and/or a device of the social network 11.

The previously taken images of the conference participants that may be used as the comparative image for matching the images of conference participants captured via the conference appliance can be obtained from the social network 11 or may be images that were previously downloaded into the memory of the conference appliance for those participants as part of the scheduling of the conference resources and/or the inviting of the conference appliance to join the communication session. For example, in some embodiments, the conference appliance may request images of the conference participants identified as being within the conference room from the server computer device 11a of the social network and the server device may subsequently respond to that request by sending data including the images of the identified conference participants that are stored in user profiles for those participants. The user profiles may be within a database car other type of data store in the memory of the server computer device. The visual recognition comparison and validation may be performed after the conference appliance has access to both a reference image for each conference participant and the currently captured image of the conference participant.

If all the conference participants are determined to be who they say they are and found to be properly invited and/or authorized to participate in the conference session, the conference appliance may allow the users to join the session and activate the connection for the conference communication session between the conference appliance communication device 2 or other conference communication session devices for establishing the conference session for the audio and/or video data streams to be mixed and distributed to the conference participants in multiple different remote locations. If an attempted participant is determined to not have a voice and/or image match to confirm that person's identity or if an attempted participant is determined to be who that person says he or she is but is not authorized to be included in the communication session, the conference appliance may emit a warning to prevent that user from participating in the conference session where audio and/or video may be exchanged between conference participants during that session. In some embodiments, the conference appliance may not join the users in the conference room of the conference appliance to a conference session until input has been received from a user that either authorizes the unauthorized participant's presence or informs the conference appliance that the unauthorized person has left the conference room and is not participating. If the conference appliance is informed that an unauthorized user is no longer in the conference room, the conference appliance may again attempt to validate all currently present users to confirm this inputted information is correct before establishing a connection to the communication device 2 or other device for actively joining the users in the conference room to the conference communication session. Alternatively, the conference appliance may be configured to join the users to the conference communication session immediately after receipt of input indicating that the unauthorized user(s) are no longer within the conference room of the conference appliance.

In some embodiments, the conference appliance can be configured to facilitate the receipt of audio from participants within the conference room of the conference appliance via a microphone array and also help facilitate output of audio from remote participants during a conference session via a speaker array by sending data to the terminal devices of the users that are joined to the communication session to mute or otherwise deactivate those devices speakers and microphones to avoid any type of confusing output of audio during the conference session. For instance, if users had joined the conference session via their terminal devise as well as being present in the conference room, their devices could pose an audio feedback issue. By sending message or other type of communication to those devices to cause the microphones and speakers of the devices of joined users in the conference room to be deactivated during the conference session to which the users are being joined, the conference appliance can help ensure that only the speaker array and microphone array designated for use in the conference room are being utilized to provide audio input and output for the conference session the deactivation of microphones and speakers also does not prevent the user's devices from participating in a screen share service so that those user's devices may still display a screen share communication that may take place during the conference session if so desired. The conference appliance may provide the audio input/output deactivation information to each joined conference participant's terminal device in the conference room of that conference appliance at the time the conference participant is being joined or prior to that conference participant being joined. In some embodiments, such information may be communicated by a message sent from the conference appliance to the user's terminal device via a short range radio communication connection or other communication connection.

Embodiments of the communication system can also be configured so that a conference appliance can permit one or more different services to be provided for a conference communication session. In some embodiments, those services may be actuated by a terminal device of a conference participant in a particular conference room after discovery of that conference appliance within the room. In other embodiments, one or more of those services may be effected via a user using his or her terminal device to invite a conference appliance to a conference communication session via communications exchanged with the social network 11 via a data network connection. In yet other embodiments, a user may effect such a service by use of his or her terminal device sending a communication directed to a conference appliance to be located within the conference room that user is in or scheduled to be in for the conference communication session via a communication that is addressed to the social network 11 (e.g. a server computer device 11a of the social network) that identifies the conference appliance and/or scheduled conference session event for having such a communication sent from the social network 11 to the conference appliance prior to the scheduled start of the conference communication session.

Figure 8:
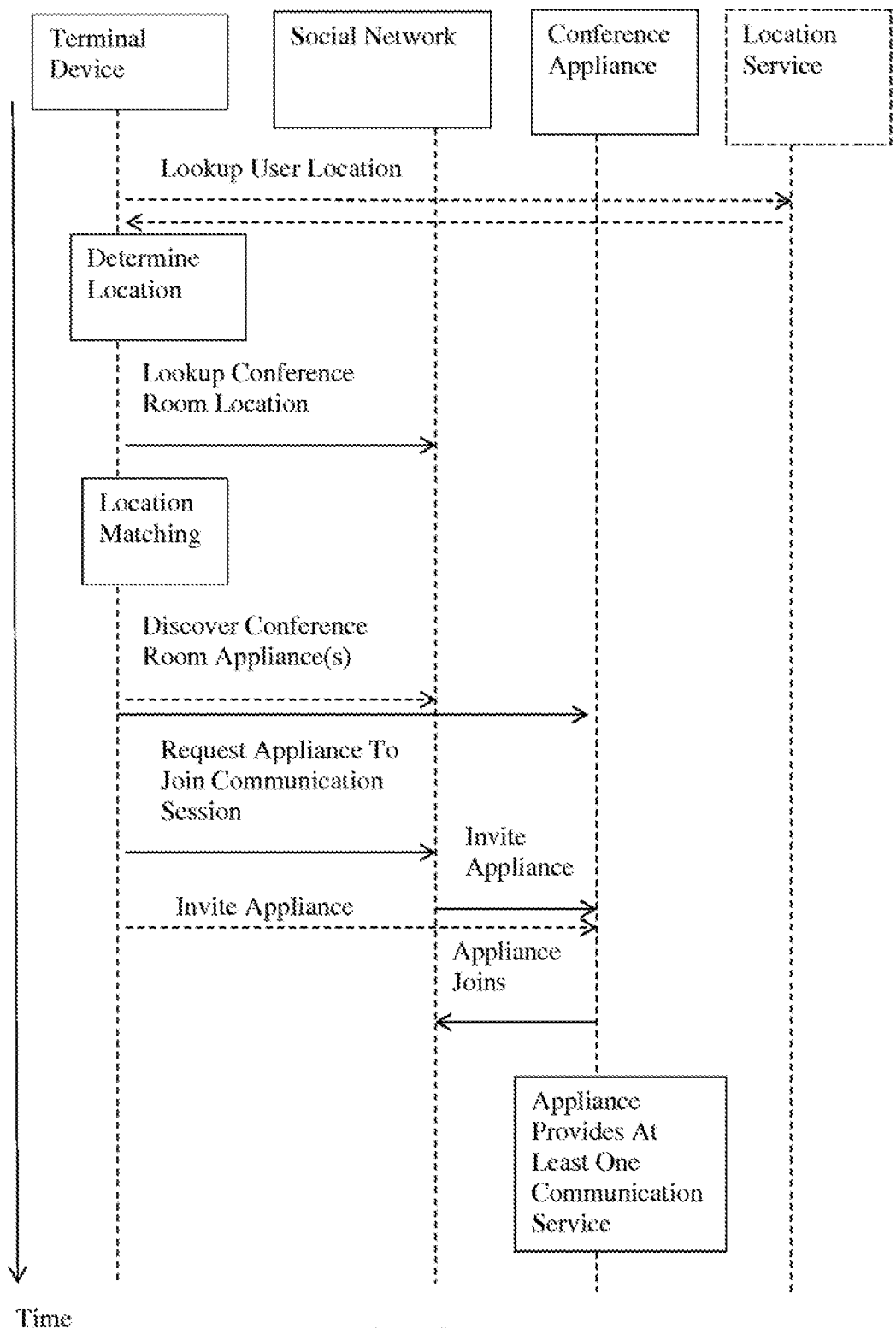
FIG. 8 is a schematic flow chart illustrating an exemplary method of using the first exemplary embodiment of a communication system to discover and select a conference appliance for use in a conference communication session.
Figure 9:
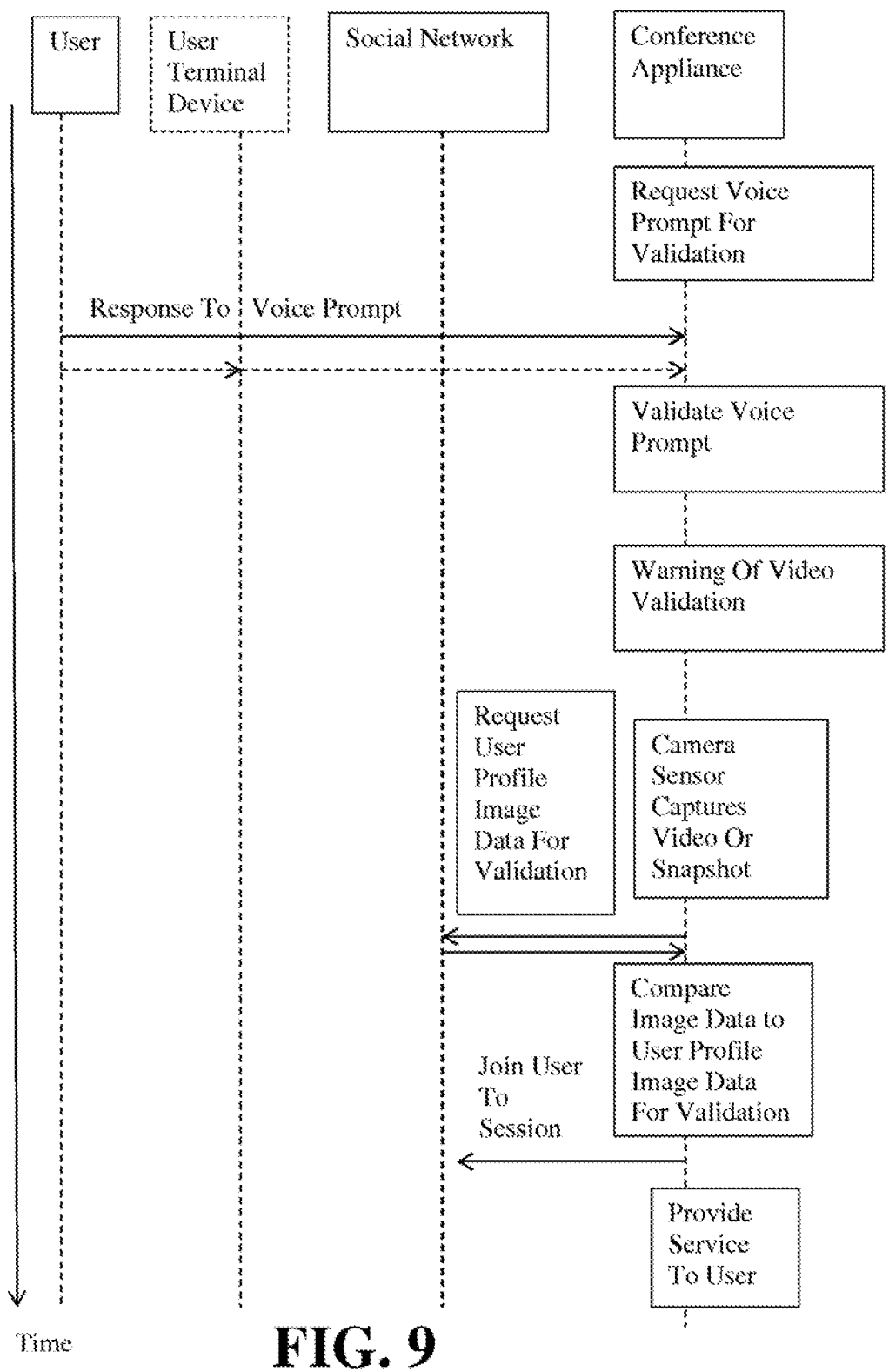
FIG. 9 is a schematic flow chart illustrating an exemplary method of using the first exemplary embodiment of a communication system to validate a user as being authorized for participation in a scheduled conference.
Figure 10:
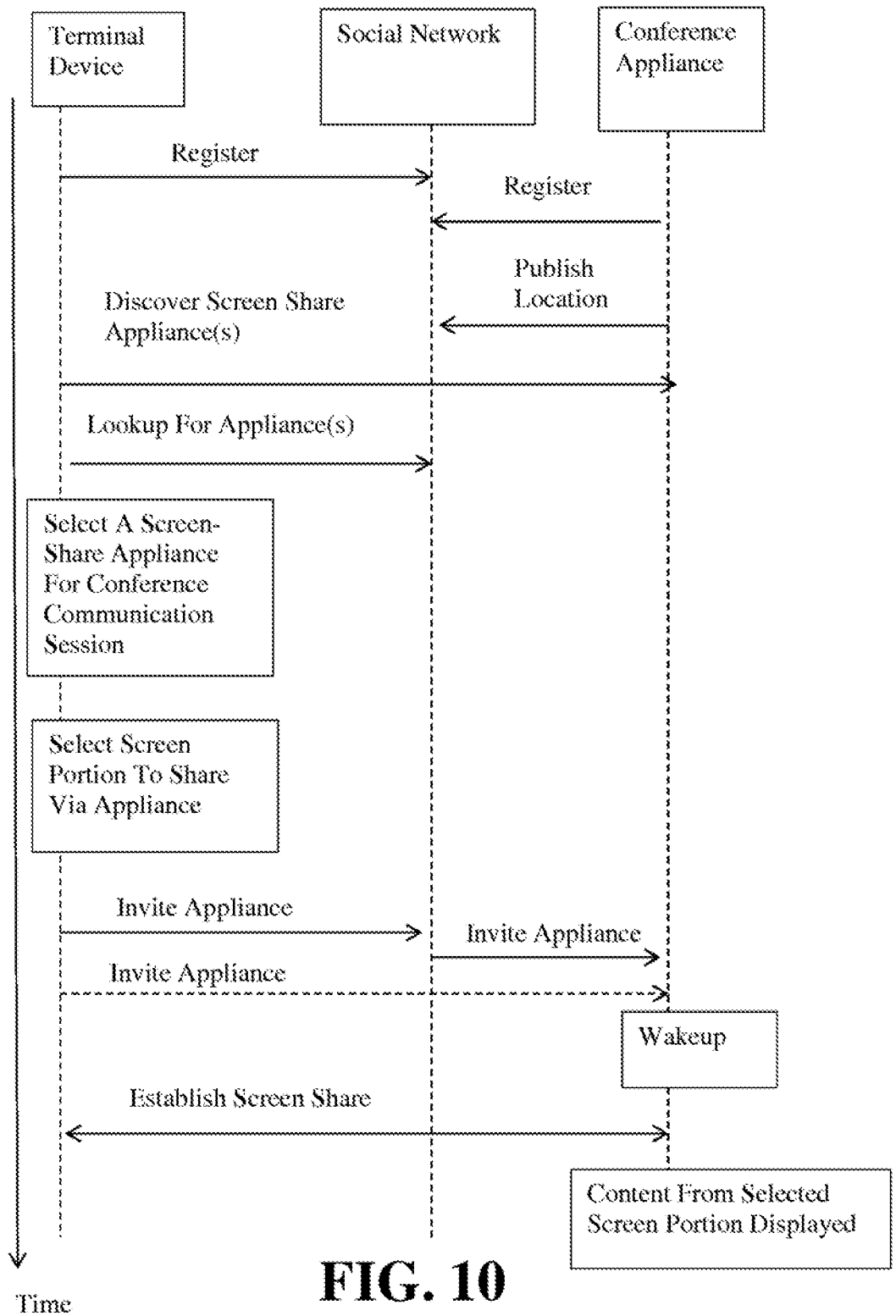
FIG. 10 is a schematic flow chart illustrating an exemplary method of using the first exemplary embodiment of a communication system to discover an appliance for use in providing a screen share service during a conference communication session.
Figure 11:
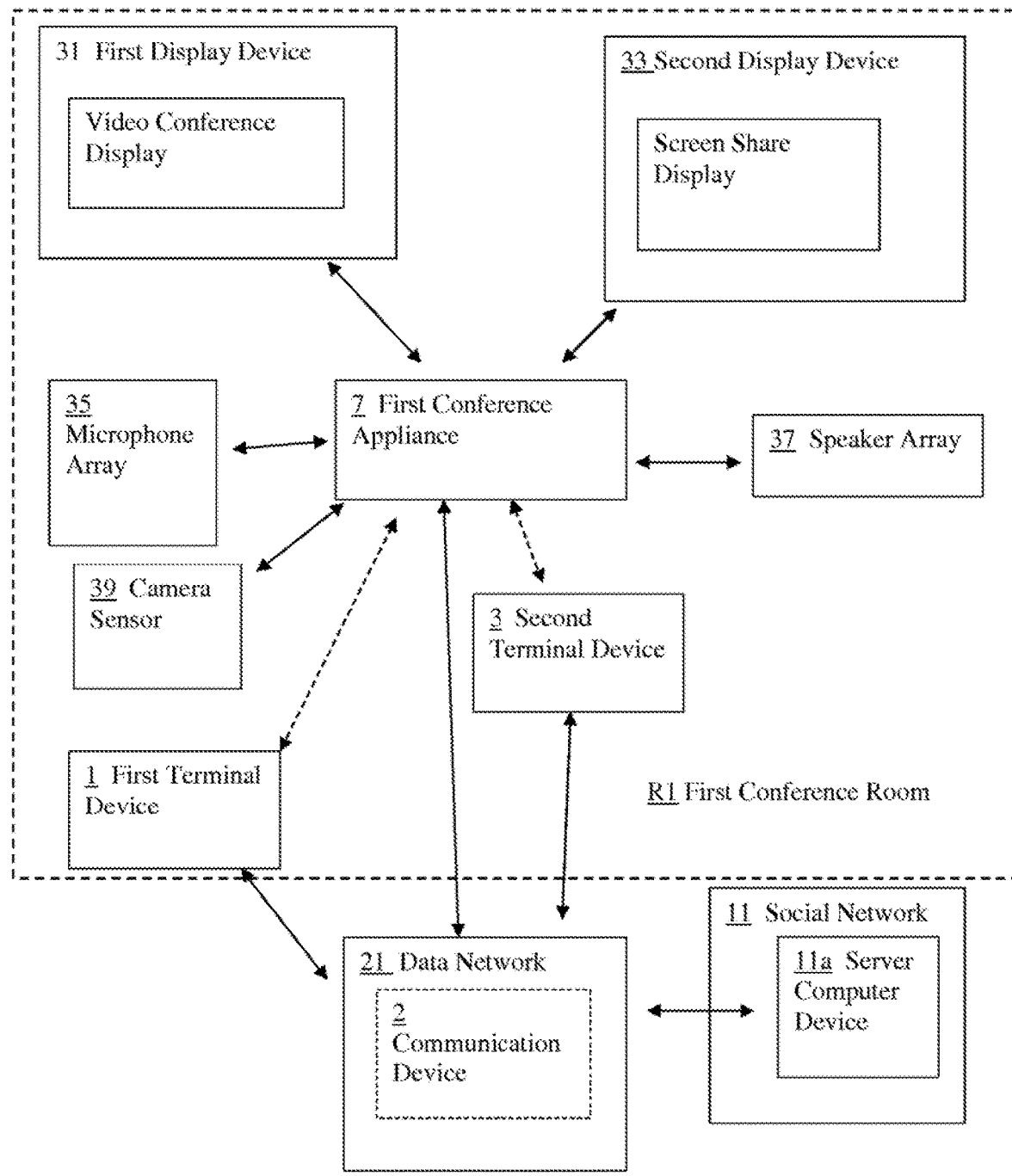
FIG. 11 is a block diagram illustrating certain exemplary communicative connections that cart be formed for first terminal device 1, second terminal device 3, social network 11, and first conference appliance 7 of the first exemplary embodiment of a communication system shown in FIG. 1 when the first and second terminal devices 1 and 3 are located in the first conference room R1.

For example, as can be appreciated from FIGS. 8 and 10, a user may utilize a terminal device to identify a conference appliance for use in a conference communication session and subsequently have his or her terminal device communicate with that conference appliance to have a service rendered for a conference communication session. In some embodiments, a user's terminal device may communicate with a location service (e.g. a global positioning system ("GPS") service or other location service hosted by a base station or server computer device) to identify a user's location and may thereafter communicate with a social network 11 (e.g. a server computer device 11a of the social network 11) to identify a location of a nearby conference appliance or conference room having such a conference appliance or to identify a conference appliance that is to be located in a conference room the user of the terminal device is scheduled to be involved in. After determining its location of the terminal device and the conference room location, these locations can be matched to identify the conference appliance that may be nearest to the user's terminal device for communicating with that conference appliance for use in obtaining a service via that appliance. The terminal device may subsequently attempt to discover the identified conference appliance(s) via communications held with the social network 11 and/or via a direct short range radio communication that terminal device may attempt to establish with the conference appliance (e.g. a Bluetooth connection). The terminal device can send a request to the social network 11 to have the discovered conference appliance(s) joined to a conference communication session that is scheduled to start or that is ongoing. The conference appliance may then be invited to the communication session via the social network 11 and joined to that session. After being joined to the communication conference session, the appliance may provide a service such as providing, a display of users located in a remote conference appliance, providing a screen share service, or by providing conference participant validation service.

In some embodiments, the conference appliance that may provide a service, such as a screen share service, for example, can be identified after both a user's terminal device and the conference appliance have registered with a social network 11. After the conference appliance has registered with the social network and published its location information and/or functionality information to the social network 11, a terminal device of a user may send a request message to the social network to discover a screen share conference appliance or other type of conference appliance for having a service rendered to the user of that terminal device. In addition, or as an alternative, the terminal device of the user may attempt to discover a nearby conference appliance via a short range radio communication discovery mechanism (e.g. Bluetooth discovery mechanism). After an applicable conference appliance is identified, a user may provide input to select that conference appliance for establishment of a connection to that appliance for that conference appliance to render a service or the terminal device may be configured to automatically select the appropriate conference appliance to render that service. Thereafter, a user may provide input to identify a portion of a display (e.g. a screen of a display) that is to be shared during a conference communication session with other conference participants. The selected portion of a screen may be the entirety of a screen displaying an active window for an interface used to generate a text document, presentation document, spreadsheet document, or other type of document. That interface may be configured to manipulate data that is stored locally on the terminal device for forming or editing a document or may be for providing data to a remote server computer device for creation or editing of that document. The selected conference appliance can then be invited to join a conference communication session to activate the conference appliance for forming a connection with the terminal device of the user for establishing the screen sharing service or other service. For screen sharing services, after the connection between the conference appliance and terminal device is formed, the conference appliance may begin rendering screen share display services for the communication conference session so that display devices in other remote conference rooms for a conference communication session display the portion of the screen of the terminal device that was to be shared.

Embodiments of the communication system and method of using the same can be configured to permit a conference initiator to use the same communication application that the user may use for performance of daily work tasks to also be used for managing conference communication sessions and conference communication resources related to those sessions. Such a feature can allow embodiments of the system to be configured so that a user need not have to undergo any additional setup or training to use conference rooms. Connectivity to any special system or special network access can also be avoided by use of embodiments of the system.

Embodiments of the system can also be configured to permit a user to initiate a conference and/or schedule a conference from a remote location and activate conference appliances for different participants located in conference rooms that are remote from the conference initiator. In some embodiments, distinct participants in a conference (e.g. conference participants located in different conference rooms at different spaced apart office locations) can invite distinct conference room appliances at their respective locations to join the conference for providing conference services for the participants at their respective conference rooms. Access to such functionality can also be provided with a relatively low overhead cost to an end-user. For example, in some embodiments the only pre-requisite for access to such functionality can be access to the social network application for access to the social network when that application is run by a user's terminal device and a data network connection.

It should be appreciated that different embodiments of the communication system can include other arrangements or designs to meet a particular set of design criteria. For instance the organization and elements of the social network 11 that are configured to support services offered by that network can include a number of different server computer devices, database server computer devices, gateways, and other elements. As another example, there may be multiple communication devices 2 that can be configured to support different types of communications such as at least one conference server computer device, at least one private branch exchange, and at least one switch device. As yet another example, each of the terminal devices used by a user to communicate with other users using other terminal devices in the system can be any type of communication terminal device. Each of the terminal devices may have a particular application stored in its memory that is configured to be run on that device for providing an interface to the social network for communicating with the social network for use of one or more communication services via the social network. Each service offered to each user can be based on authorization levels of each user, the user's position with an employer, and other design criteria factors. As yet another example, authorization protocols, use of firewalls, use of authorization servers, use of bandwidth management mechanisms, use of communication routing mechanisms for the sending and receiving of data via the communication system, use of encryption and encryption related protocols, use of security arrangements configured to protect the communication system from denial of service attacks and/or other types of hacking related attacks, and use of other types of security measures can be utilized in embodiments of the communication system to help ensure a pre-selected quality of service level and a pre-selected level of security desired for the communications being facilitated via the communication system.

While certain exemplary embodiments of the communication apparatus, communication system, and methods of making and using the same have been shown and described above, it is to be distinctly understood that the invention is not limited thereto but may be otherwise variously embodied and practiced within the scope of the following claims.

What is claimed is:

1. A communication system, comprising:
   at least one server computer device; and
   at least one conference appliance communicatively connectable to the server computer device to register with the server computer device so that a location of the conference appliance is published so that the location of the conference appliance is determinable by a terminal device registered with the at least one server computer device; and
   the terminal device communicatively connectable to the at least one server and the conference appliance, the terminal device configured to register with the at least one server computer device to utilize a social networking service hosted by the at least one server computer device, the terminal device configured to communicate authentication information to the at least one server computer device before establishing a connection for use of the social networking service;
   the terminal device configured to generate a graphical user interface after registration with the at least one server device to facilitate receipt of input from a user for communicating requests for social network services to the at least one server computer device, the graphical user interface having icons, each icon representing an entity that is joinable to a conference communication session, each conference appliance being represented as a respective one of the icons for joining to the conference communication session such that input for selection of the conference appliance for utilization of the conference appliance in the conference communication session is providable via selection of the icon representing that conference appliance; and
   the server computer device configured so that, in response to receiving a communication from a terminal device initiated via the graphical user interface relating to a scheduling of the conference communication session, the server computer device is configured to:
   communicate with a communication device to automatically schedule use of resources for the conference communication session based on information included in the communication from the terminal device such that the communication device reserves conference communication session resources so that the conference communication resources are available for the conference communication session when that conference communication session is scheduled to occur,
   communicate with terminal devices of users to be invited to the conference communication session identified in the communication from the terminal device relating to the scheduling of the conference communication session or a calendar server computer device that manages calendars for different users to have calendars associated with the users to be invited to the conference communication session updated to identify the scheduled conference communication session, and/or
   send information to the terminal device such that a conference appliance is identifiable to the terminal device for the terminal device to establish a connection with that conference appliance for use of at least one service for the conference communication session; and
   the server computer device also configured so that, in response to receipt of input provided via selection of the icon representing the conference appliance, the server computer device communicates with the conference appliance to join the conference appliance to the conference communication session.

2. The communication system of claim 1, wherein the server computer device is configured to communicate with a conference appliance to join that conference appliance to the conference communication session; and
   wherein the conference appliance is configured to validate each conference participant located within a conference room of the conference appliance after being joined to the conference communication session to verify that each conference participant in the conference room is authorized to participate in the conference communication session.

3. The communication system of claim 2, wherein the validation of each conference participant comprises voice validation based on a voice sample recorded from each conference participant and a stored voice sample of that conference participant that was previously recorded.

4. The communication system of claim 3, wherein the validation of each conference participant comprises image validation based on an image of each conference participant recorded via the conference appliance and an image of that conference participant that was previously captured and stored.

5. The communication system of claim 2, wherein the validation of each conference participant comprises image validation based on an image of each conference participant captured in the conference room via the conference appliance and an image of that conference participant that was previously captured and stored.

6. The communication system of claim 1, wherein the server computer device is configured to communicate with a conference appliance to join that conference appliance to the conference communication session; and
   wherein the conference appliance is configured to set a language setting based on information received from the server computer device or the terminal device.

7. The communication system of claim 6, wherein the language setting is set by the conference appliance in response to information received from the terminal device that identifies a language for the language setting based on an evaluation of language utilized in a pre-selected number of communications exchanged with a user of that terminal device via a service hosted by the at least one server computer device.

8. The communication system of claim 7, wherein the server computer device is configured to send information relating to a number of communications exchanged with the user via the service to the terminal device in response to a request sent by the terminal device, the information relating to the number of communications exchanged with the user via the service being analyzable by the terminal device to select a language to which the language setting of the conference appliance is to be set.

9. The communication system of claim 1, wherein the server computer device is configured to communicate with the conference appliance to join that conference appliance to the conference communication session such that the conference appliance establishes a connection to the terminal device to provide a screen share service for the conference communication session.

10. The communication system of claim 9, wherein the conference appliance is configured to communicate with the terminal device to display a selected portion of a screen of the terminal device or a portion of a graphical user interface of an application displayed on the screen during the conference communication session.

11. The communication system of claim 1, wherein the server computer device is configured to communicate with a conference appliance or the terminal device to effect a joining of a conference appliance to the conference communication session via a process that comprises:
the server computer device responding to a request for an identification of a conference appliance that is configured to provide the service that is received from the terminal device by identifying that conference appliance to the terminal device based on information received from the conference appliance when that conference appliance registered with the server computer device and the server computer device automatically sends a message to the conference appliance to join the communication conference session in response to a message from the terminal device identifying that conference appliance for use of the service.

12. The communication system of claim 11, wherein the server computer device is configured to effect a joining of a conference appliance to the conference communication session via a process that comprises:
the server computer device responding to a request for an identification of a conference appliance that is configured to provide a service for the conference communication session within a conference room reserved for the conference communication session that is received from the terminal device by identifying at least one conference appliance to the terminal device based on information received from each conference appliance when that conference appliance registered with the server computer device; and
wherein the terminal device is configured to automatically select a conference appliance based on the response from the server computer device and automatically send a communication to the conference appliance to invite the conference appliance to the conference communication session.

13. The communication system of claim 12, wherein the conference appliance is configured to join the conference communication session and establish a screen share with the terminal device to communicate data for the conference communication session for providing a screen share service based on a portion of a screen of the terminal device during the conference communication session in response to the communication the conference appliance receives from the terminal device that invites the conference appliance to the conference communication session.

14. The communication system of claim 11, wherein the server computer device is configured to communicate with a conference appliance to join that conference appliance to the conference communication session; and
wherein the conference appliance is configured to receive audio from conference participants within a conference room for the conference communication session and the conference appliance is configured to output audio of the conference communication session in the conference room during the conference communication session; and
the conference appliance is configured to communicate with terminal devices of conference participants within the conference room to deactivate microphones and speakers of the terminal devices during the conference communication session.

15. A communication apparatus, comprising:
a terminal device, the terminal device being communicatively connectable to at least one conference appliance, the terminal device also being communicatively connectable to a server computer device that is configured to provide at least one social network service;
the terminal device being configured to communicate with one of the server computer device and the conference appliance to join the conference appliance to a conference communication session for providing at least one service for that conference communication session such that a graphical user interface is displayable by the terminal device to communicate a request to join the conference appliance to the conference communication session, the graphical user interface having icons, each icon representing an entity that is joinable to a conference communication session, each conference appliance being represented as a respective one of the icons for joining to the conference communication session such that input for selection of the conference appliance for utilization of the conference appliance in the conference communication session is providable via selection of the icon representing that conference appliance for actuating the joining of the conference appliance to the conference communication session;
wherein a first conference application of the at least one conference appliance is configured to receive audio from conference participants within a conference room for the conference communication session and the conference appliance is configured to output audio of the conference communication session in the conference room during the conference communication session; and
the first conference appliance is also configured to communicate with terminal devices of conference participants within the conference room to deactivate microphones and speakers of the terminal devices during the conference communication session at a time the conference appliance is joined to the conference communication session.

16. The communication system of claim 15, comprising the first conference appliance and wherein the terminal device is configured to determine a location of the terminal device and determine a location of at least the first conference appliance, match the determined location of the terminal device with the location of the first conference appliance to select the first conference appliance as being closest to the determined location of the terminal device, discover the selected first conference appliance via a short range radio communication mechanism, and request the first conference appliance to join the conference communication session.

17. The communication system of claim 15, wherein the terminal device is configured to communicate with the server computer device to receive information relating to text within messaging exchanged with a user of the terminal device via a service hosted by the server computer device, analyze the text of the messaging to identify a language setting for selecting a language setting for the conference appliance, and send a message to the first conference appliance to select that identified language setting for at least one of audio and visual prompts to be communicated by the conference appliance.

18. The communication system of claim 17, wherein the terminal device is configured to discover the first conference appliance within a pre-selected time period of a scheduled conference communication session and directly communicate with the discovered first conference appliance to join the first conference appliance to the conference communication session via the short range radio communication mechanism.

19. The communication system of claim 17, wherein the first conference appliance is configured to provide a prompt to at least one conference participant within a conference room of the conference appliance to record a voice sample from that conference participant in a conference room of that conference appliance and validate the voice sample with a previously recorded voice sample of that conference participant accessible to the first conference appliance to verify that the conference participant is authorized to be included in the conference communication session;

wherein the first conference appliance is configured to provide an audible warning to at least one conference participant within a conference room of the first conference appliance to inform each conference participant that an image of that conference participant is to be captured, effect a capturing of the image after the warning is provided, and compare the image of each conference participant with at least one image that was previously captured of that conference participant to validate the conference participant to verify that the conference participant is authorized to be included in the conference communication session; and wherein the first conference appliance is also configured to provide a prompt to at least one conference participant within the conference room of the conference appliance to record a voice sample from that conference participant and validate the voice sample with a previously recorded voice sample of that conference participant accessible to the first conference appliance to verify that the conference participant is authorized to be included in the conference communication session.

20. A method of facilitating a conference communication session via a communication network, the method comprising:

a terminal device having a processor and non-transitory computer readable medium registering with the at least one server computer device to utilize a social networking service hosted by the at least one server computer device, the terminal device communicating authentication information to the at least one server computer device before establishing a connection for use of the social networking service;

the terminal device generating a graphical user interface after registration with the at least one server device to display the graphical user interface to a user to facilitate receipt of input from the user for communicating requests for social network services to the at least one server computer device, the graphical user interface having icons, each icon representing an entity that is joinable to a conference communication session, a conference appliance being represented as a respective one of the icons for joining to the conference communication session such that input for selection of the conference appliance for utilization of the conference appliance in the conference communication session is providable via selection of the icon representing that conference appliance for actuating the joining of the conference appliance to the conference communication session; and in response to receiving a communication from the terminal device initiated via the graphical user interface relating to a scheduling of the conference communication session, the server computer device:

communicating with a communication device to automatically schedule use of resources for the conference communication session based on information included in the communication from the terminal device such that the communication device reserves conference communication session resources so that the conference communication resources are available for the conference communication session when that conference communication session is scheduled to occur, communicating with terminal devices of users to be invited to the conference communication session identified in the communication from the terminal device relating to the scheduling of the conference communication session or a calendar server computer device that manages calendars for different users to have calendars associated with the users to be invited to the conference communication session updated to identify the scheduled conference communication session, and/or sending information to the terminal device such that a conference appliance is identifiable to the terminal device for the terminal device to establish a connection with that conference appliance for use of at least one service for the conference communication session; and in response to receipt of input provided via selection of the icon representing the conference appliance transmitted to the server computer device via the terminal device, the server computer device communicating with the conference appliance to join the conference appliance to the conference communication session.

* * * * *